(12) United States Patent
Charier et al.

(10) Patent No.: US 8,967,950 B2
(45) Date of Patent: Mar. 3, 2015

(54) DRIVE MECHANISM FOR A PAIR OF CONTRA-ROTATING PROPELLERS THROUGH AN EPICYCLIC GEAR TRAIN

(75) Inventors: Gilles Alain Charier, La Grande Paroisse (FR); Francois Gallet, Paris (FR)

(73) Assignee: SNECMA, Paris (FR)

( * ) Notice: Subject to any disclaimer, the term of this patent is extended or adjusted under 35 U.S.C. 154(b) by 756 days.

(21) Appl. No.: 13/255,389

(22) PCT Filed: Mar. 9, 2010

(86) PCT No.: PCT/EP2010/052963
§ 371 (c)(1), (2), (4) Date: Nov. 23, 2011

(87) PCT Pub. No.: WO2010/102995
PCT Pub. Date: Sep. 16, 2010

(65) Prior Publication Data
US 2012/0099988 A1    Apr. 26, 2012

(30) Foreign Application Priority Data

Mar. 11, 2009    (FR) .................................... 09 51509

(51) Int. Cl.
*F04D 13/02*    (2006.01)
*F04D 25/02*    (2006.01)
(Continued)

(52) U.S. Cl.
CPC ................ *F01D 5/026* (2013.01); *B64D 35/06* (2013.01); *F02C 3/067* (2013.01); *F02C 3/10* (2013.01);
(Continued)

(58) Field of Classification Search
CPC ............. F01D 1/26; F01D 1/24; F01D 15/12; F05D 2260/40311; F16H 1/2836; F16H 57/08
USPC ........ 416/170 R, 128, 129; 415/122.1, 124.2, 415/68, 69; 475/346, 347
See application file for complete search history.

(56) References Cited

U.S. PATENT DOCUMENTS 4,817,382 A * 4/1989 Rudolph et al. ................. 60/268
5,010,729 A    4/1991 Adamson et al.
(Continued)

FOREIGN PATENT DOCUMENTS

| EP | 1 887 199 A2 | 2/2008 |
|---|---|---|
| FR | 2 641 333 A1 | 7/1990 |
| GB | 2 225 297 A | 5/1990 |

OTHER PUBLICATIONS

U.S. Appl. No. 13/148,404, filed Aug. 8, 2011, Charier, et al.
(Continued)

*Primary Examiner* — Dwayne J White
*Assistant Examiner* — Su Htay
(74) *Attorney, Agent, or Firm* — Oblon, McClelland, Maier & Neustadt, L.L.P.

(57) ABSTRACT

A turbine driving a planet gear and an epicyclic gear train and including a planet pinion cage and a ring driving two propellers in rotation, is connected to the planet gear through a flexible sleeve surrounding a turbine support shaft rather than through a support shaft itself to achieve a flexible assembly with a limit stop position in contact with the shaft to limit parasite internal forces applied to the epicyclic gear train without tolerating a loose assembly or breakage of the sleeve due to a condition of the limit stop after a clearance has been eliminated.

6 Claims, 2 Drawing Sheets

(51) Int. Cl.
*F01D 5/02* (2006.01)
*B64D 35/06* (2006.01)
*F02C 3/067* (2006.01)
*F02C 3/10* (2006.01)
*F02C 7/36* (2006.01)
*F02K 3/072* (2006.01)

(52) U.S. Cl.
CPC . *F02C 7/36* (2013.01); *F02K 3/072* (2013.01); *F05D 2240/62* (2013.01); *F05D 2260/4031* (2013.01); *F05D 2260/96* (2013.01)
USPC .................. 415/122.1; 415/124.2; 416/170 R

(56) References Cited

U.S. PATENT DOCUMENTS

| | | | |
|---|---|---|---|
| 5,862,706 A * | 1/1999 | Chen et al. | 74/411 |
| 2007/0225111 A1* | 9/2007 | Duong et al. | 475/331 |
| 2008/0022653 A1* | 1/2008 | Schilling | 60/226.1 |
| 2009/0148274 A1* | 6/2009 | Kostka et al. | 415/170.1 |
| 2010/0150702 A1* | 6/2010 | Sheridan et al. | 415/170.1 |
| 2011/0243735 A1 | 10/2011 | Balk et al. | |

OTHER PUBLICATIONS

U.S. Appl. No. 14/164,827, filed Jan. 27, 2014, Hugon, et al.

* cited by examiner

DRIVE MECHANISM FOR A PAIR OF CONTRA-ROTATING PROPELLERS THROUGH AN EPICYCLIC GEAR TRAIN

The subject of this invention is a drive mechanism for a pair of contra-rotating propellers through an epicyclic gear train.

Contra-rotating propellers are already known, and are also envisaged for use on some future aircraft in order to reduce fuel consumption. Power transmission to propellers may include an epicyclic gear train. The power turbine (low pressure) rotates a shaft rotating a planet gear (sun gear) forming part of the epicyclic gear train. The planet gear itself drives satellite gears and a planet pinion cage connected to the shaft of one of the propellers. The epicyclic gear also comprises an outer ring with teeth on the inside that engages with the satellites, and which is connected to the shaft of the other propeller. Therefore, a judicious choice of gear teeth ratio allows propeller rotations in the two opposite directions with the required speed ratio. Such an arrangement is described in document U.S. Pat. No. 4,817,382, while document EP-A-1 887 199 discloses an arrangement in which a planet pinion cage in an epicyclic gear train is supported at the end of a rotating shaft through a flexible joint that absorbs deformations and reduces stresses in the gear train.

The advantage of the epicyclic gear train is that it is compact, but high forces are applied to it that might damage the teeth. The main purpose of the invention is to reduce these forces so that it transmits essentially the drive torque necessary for the transmission while reducing parasite forces like those caused by misalignment of the toothed wheels. But the mechanism must resist high forces that are applied under some circumstances.

This twofold requirement is satisfied with the invention which, in a general form, relates to a mechanism comprising a pair of contra-rotating propellers, a drive turbine, a shaft connected to the turbine, a transmission comprising an epicyclic gear train with a central planet gear driven by the turbine, a planet pinion cage driving one of the propellers and fitted with satellite gears engaging with the planet gear and an outer ring engaging with the satellite gears and driving the other propeller, characterised in that it comprises a sleeve connected to the turbine and to the planet gear to drive it, the sleeve being surrounded by the shaft and more flexible in bending than the shaft.

The flexible sleeve is used to support the planet gear in replacement of the turbine shaft that supports the turbine rotor on the casing, and this sleeve tolerates variations in the position of its axis depending on radial forces resisted by the planet gear. This reduces the forces developed in the epicyclic gear train. However, since the clearance between the fixed turbine shaft and the flexible sleeve is small, there is a position in which the sleeve stops in contact with the shaft when high forces are applied in the transmission. This prevents excessive flexibility that could prevent the mechanism from operating correctly or even cause its destruction, firstly as a result of the sleeve breaking, and the high forces that might occasionally occur are transmitted to the rigid and strong turbine shaft.

It is advantageous if the turbine shaft is long enough so that it provides a more stable support and that cantilevers of the sleeve beyond the turbine shaft are prevented when a thrust contact is made. Therefore, the distance between two support bearings of the turbine shaft is larger than the distance between one of the bearings and the planet gear.

The arrangement of the invention is better than the arrangement shown in document EP-A-1 887 199 for the following reasons; firstly the sleeve according to the invention that is longer than the flexible joint in the referenced document allows greater movements and therefore better flexibility and a greater reduction of internal forces; secondly, support by the turbine shaft once the clearance has been eliminated provides a well-defined limit to the movement while protecting the sleeve against excessive deformations; finally, the arrangement of the sleeve in the turbine shaft makes it possible to place the epicyclic gear train at a short distance from the closest shaft support bearing, which reduces the size and the cantilever, while the gear train described in the referenced document is much further in front of the bearing so that the flexible joint can be installed.

The sleeve is made well flexible when it forms a semi-circular bend at one end of the connection to the turbine, or if it comprises a section with oblong openings oriented at an angle of 45° from an axial direction of the sleeve, which weakens the sleeve locally such that it becomes more flexible in bending, while maintaining its torsion strength so that it can transmit the required torque. The recessed section may be located at the junction between the bend and one of the main sleeve contact surfaces, when there is a bend.

The forces in the epicyclic gear train can be further reduced if the shaft connected to the ring is more flexible than the shaft connected to the planet pinion cage. The assembly connected to the planet pinion cage is comparatively rigid and is then located between a planet gear assembly and a comparatively flexible ring assembly, which deform independently depending on the forces applied to each.

The invention will now be described with reference to the following figures.

Figure 4:
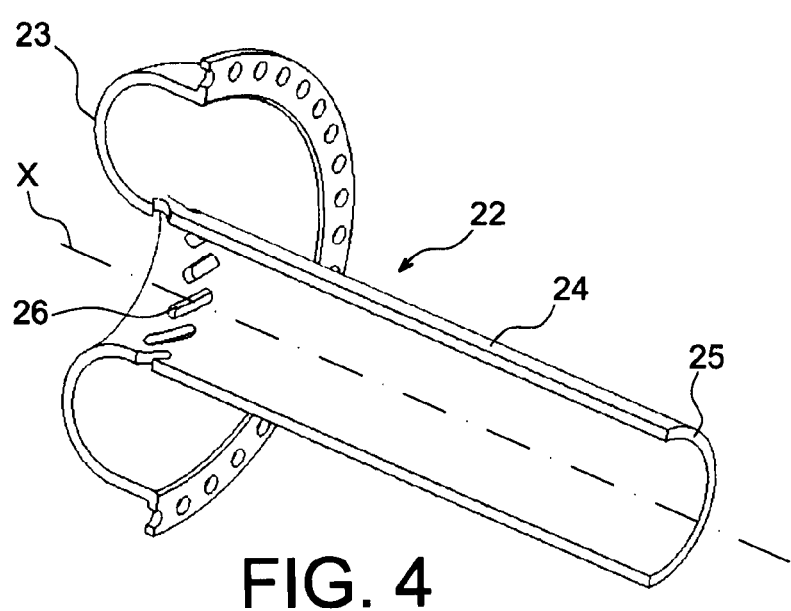

and FIG. 4 shows a particular portion of the flexible sleeve.

Figure 1:
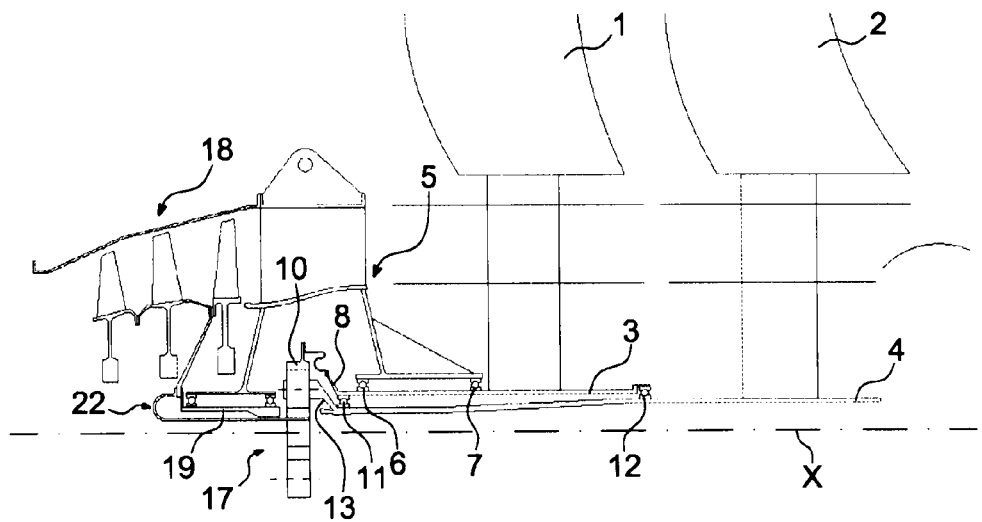
FIG. 1 is a general view of the mechanism according to the invention.
Figure 2:
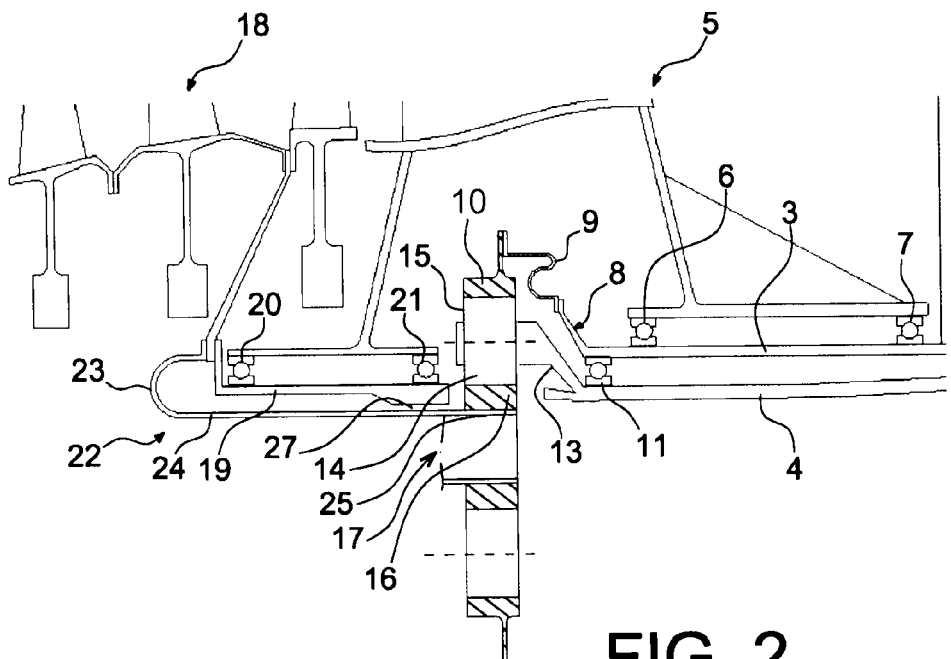
FIG. 2 shows the layout around the epicyclic gear train.
Figure 3:
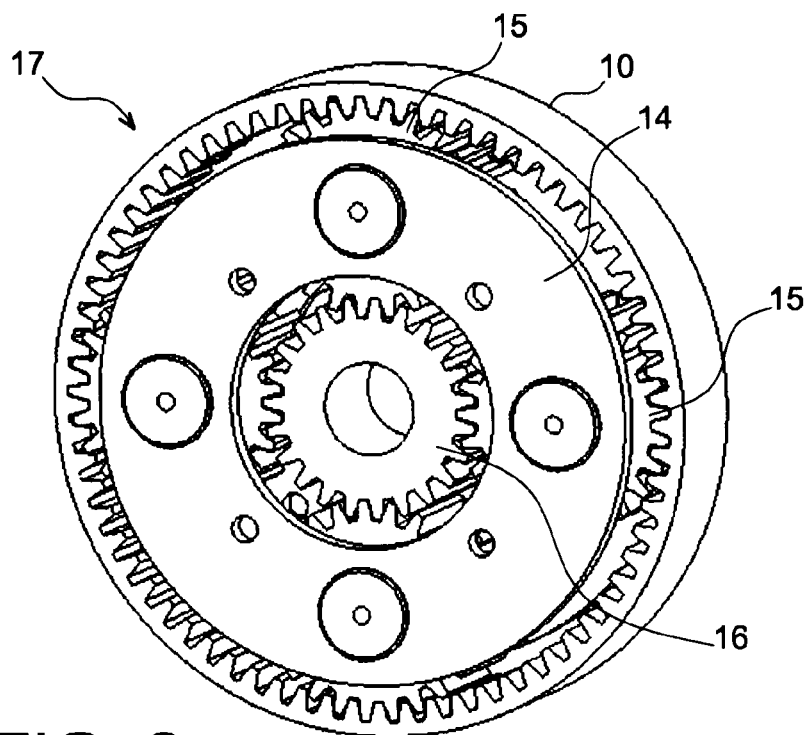
FIG. 3 shows a front view of the epicyclic gear train.

Refer to FIGS. 1 and 2. The engine of which the invention forms part comprises two propellers 1 and 2, each arranged to rotate about the same X axis. The upstream propeller 1 is installed on a first hollow shaft 3 and the downstream propeller 2 is installed on a second hollow shaft 4. The first hollow shaft 3 is supported on a static casing 5 through a pair of bearings 6 and 7 beyond which it spreads out into a conical sleeve 8 with corrugations 9, and ends up at a ring 10 with teeth formed on the inside. The second hollow shaft 4 is supported by the first hollow shaft 3 through two bearings 11 and 12 and spreads out into a second conical sleeve 13 contained inside the first conical sleeve 8 and that is connected to a planet pinion cage 14. The planet pinion cage 14 has satellite toothed gears 15 distributed around a circle that engage on the outside with the ring 10 and on the inside with a planet (or sun) gear 16. The assembly forms a conventional type of epicyclic gear train 17 as shown in FIG. 3.

A low pressure turbine 18 is located on the other side of the static casing 5. It comprises a third hollow shaft that is a turbine shaft 19 that supports the turbine on the static casing 5 by means of two bearings 20 and 21. The turbine shaft 19 extends not far from the planet gear 16, however it is separated from it; the clearance between the planet gear 16 and the closest bearing 21 is less than the distance between the two bearings 20 and 21. A flexible sleeve 22 drives the planet gear 16 by connecting it to the rotor of the turbine 18. The flexible sleeve 22 is connected to the turbine 18 through a semi-circular bend 23 not far from the connection to the turbine shaft 19. The essential part of the flexible sleeve 22 is an essentially cylindrical contact surface 24 surrounded by the turbine shaft 19, and extending beyond it through a third end 25 and acting as a support for the planet gear 16. Oblong openings 26 are formed in the flexible sleeve 22 at the junction between the bends 23 and the contact surface 24, and are shown most clearly in FIG. 4, their direction of extension being at an angle of 45° relative to the X axial direction of the mechanism, which corresponds to the rotation axis of all rotating parts (except for the satellite gears 15). The sleeve 22 is flexible because it is sufficiently thin, but it bends particularly at the section at which it is notched.

Operation of the mechanism can be described as follows; the turbine 18 drives the planet gear 16 through the flexible sleeve 22 which causes rotations of the planet pinion cage 14 and the ring 10 and then the propellers 2 and 1, at determined speeds. The flexible sleeve 22 can bend when unbalanced forces along the radial direction are imposed on the planet gear 16. Similarly, the first conical sleeve 8 is capable of bending at the location of the corrugations 9 when unbalanced forces along the radial direction are applied to the ring 10. However, the attachment of planet pinion cage 14 to the propeller 2 through the second hollow shaft 4 and the second conical sleeve 13 is stiffer, which prevents the epicyclic gear train 17 from being too flexible. And the clearance 27 between the conical sleeve 22 and the turbine shaft 19 is small at the location of the bearing 21 close to the planet gear 16 which limits the deformations that can be applied to the flexible sleeve 22 to reasonable values and in particular prevents it from breaking and the epicyclic gear train 17 from becoming too loose. Since the flexible sleeve 22 rotates at the same speed as the turbine shaft 19, there is no fear of any consequences of this thrust state that does not create any friction.

The invention claimed is:

1. A mechanism comprising:
   a pair of contra-rotating propellers;
   a drive turbine;
   a shaft connected to the turbine;
   a static casing supporting the turbine through the shaft and two bearings, wherein the two bearings include a first bearing and a second bearing, said shaft extending in said first and second bearings, and said first and second bearings supporting said shaft;
   a transmission including an epicyclic gear train including a central planet gear driven by the turbine, wherein a distance between said first bearing and the planet gear is less than a distance between the two bearings;
   a planet pinion cage driving one of the propellers and fitted with satellite gears engaging with the planet gear;
   an outer ring engaging with the satellite gears and driving the other of the propellers; and
   a sleeve connected to the turbine and to the planet gear to drive the planet gear, the sleeve comprising a surface surrounded by the shaft, separated from the shaft by a radial clearance configured to limit deformations applied to the sleeve at said first bearing, and wherein said sleeve is more flexible in bending than the shaft, so as to deflect when unbalanced forces are imposed on the planet gear along a radial direction.

2. A mechanism according to claim 1, wherein the sleeve forms a semi-circular bend at one end of a connection to the turbine.

3. A mechanism according to claim 2, further comprising a section including oblong openings, oriented at an angle of 45° from an axial direction of the sleeve.

4. A mechanism according to claim 3, wherein the section is essentially cylindrical and located at a junction between the bend and the surface, at a distance from the connection to between the turbine and the sleeve.

5. A mechanism according to claim 1, wherein a shaft connecting the ring to the other of the propellers is more flexible than a shaft connecting the planet pinion cage to the one of the propellers.

6. A mechanism according to claim 1, wherein the radial clearance between the sleeve and the turbine shaft is smaller at the first bearing than at said second bearing.

* * * * *